No. 791,687. PATENTED JUNE 6, 1905.
L. GETTELMANN.
BEET TOPPER.
APPLICATION FILED NOV. 7, 1904.
6 SHEETS—SHEET 3.
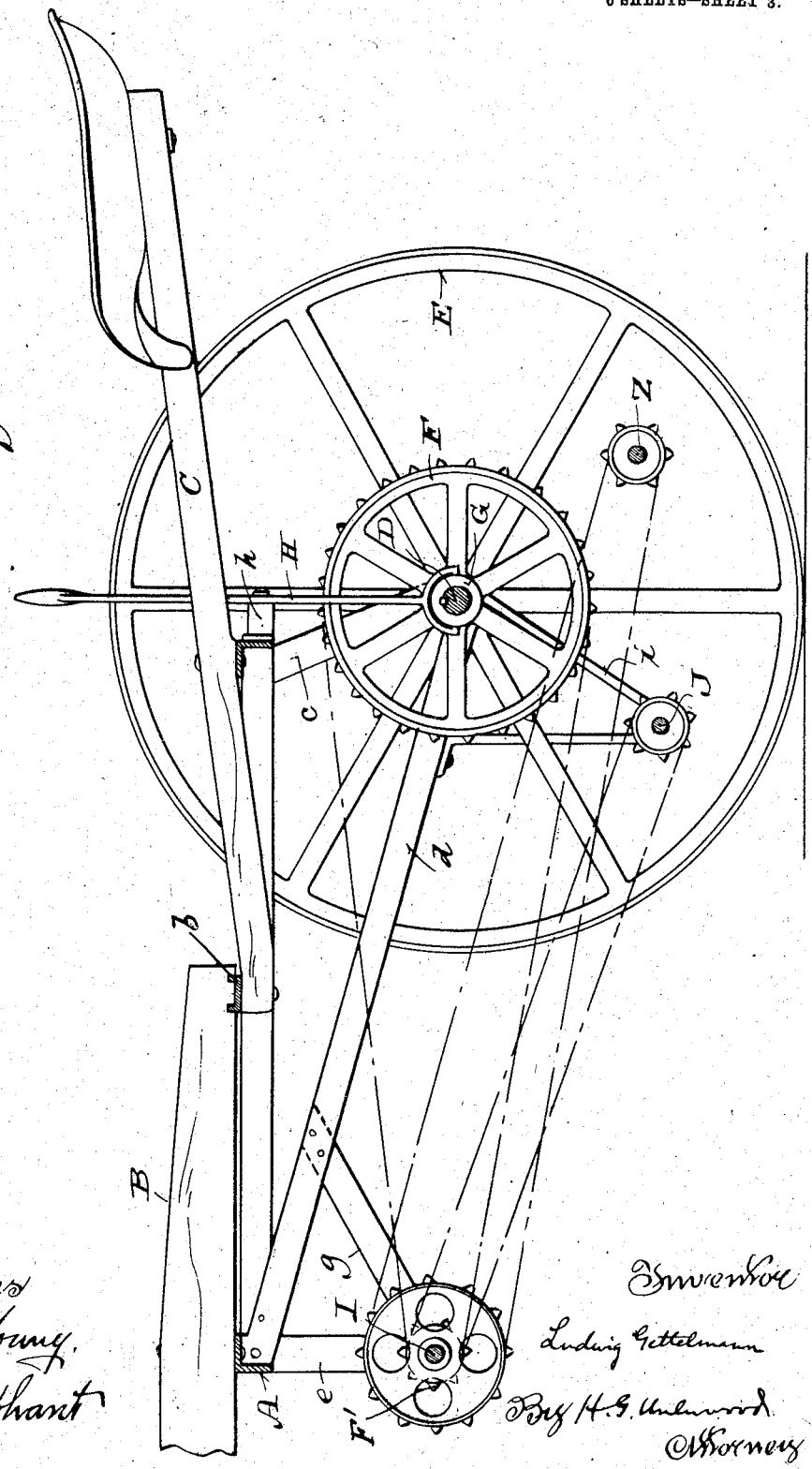

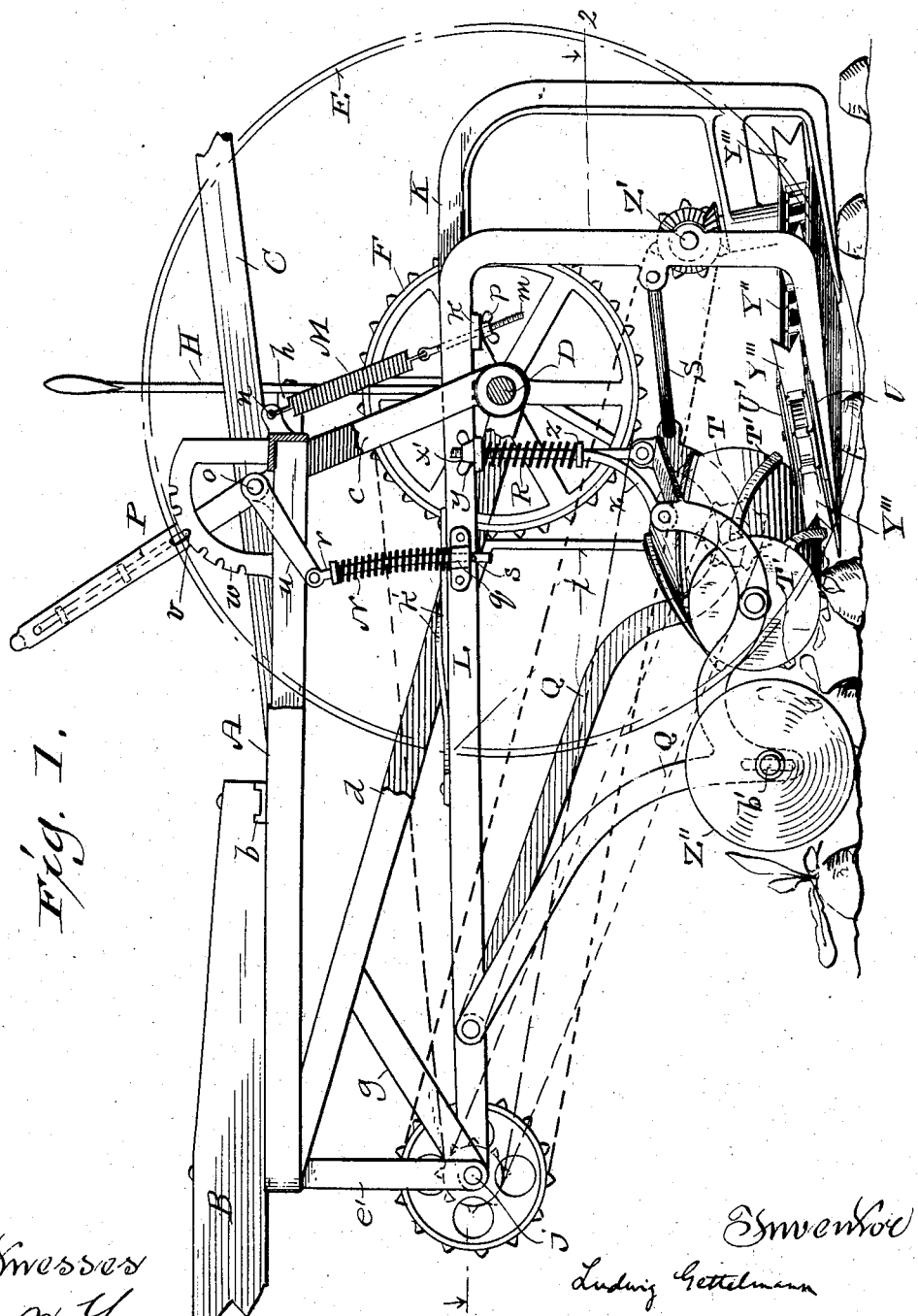

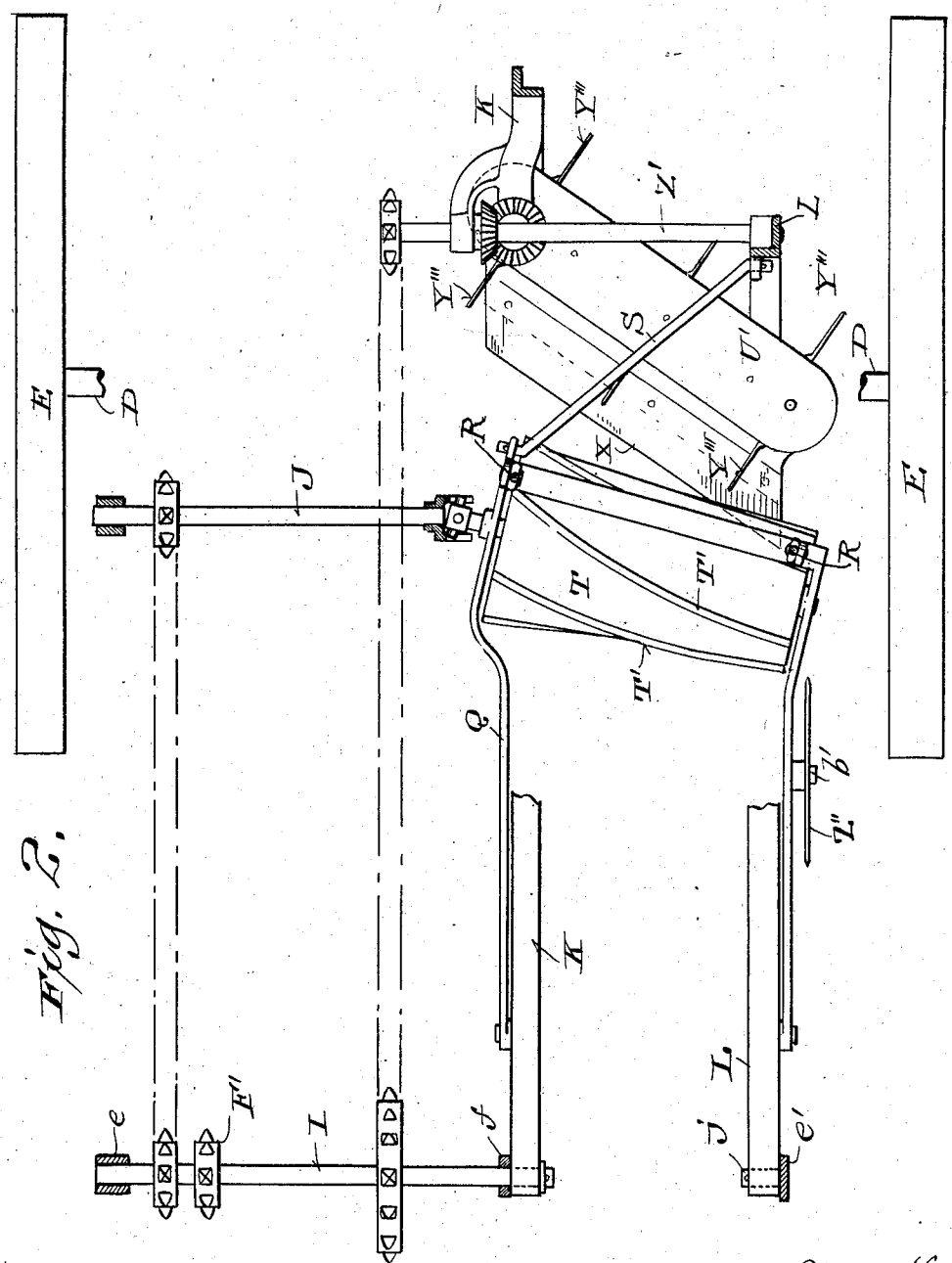

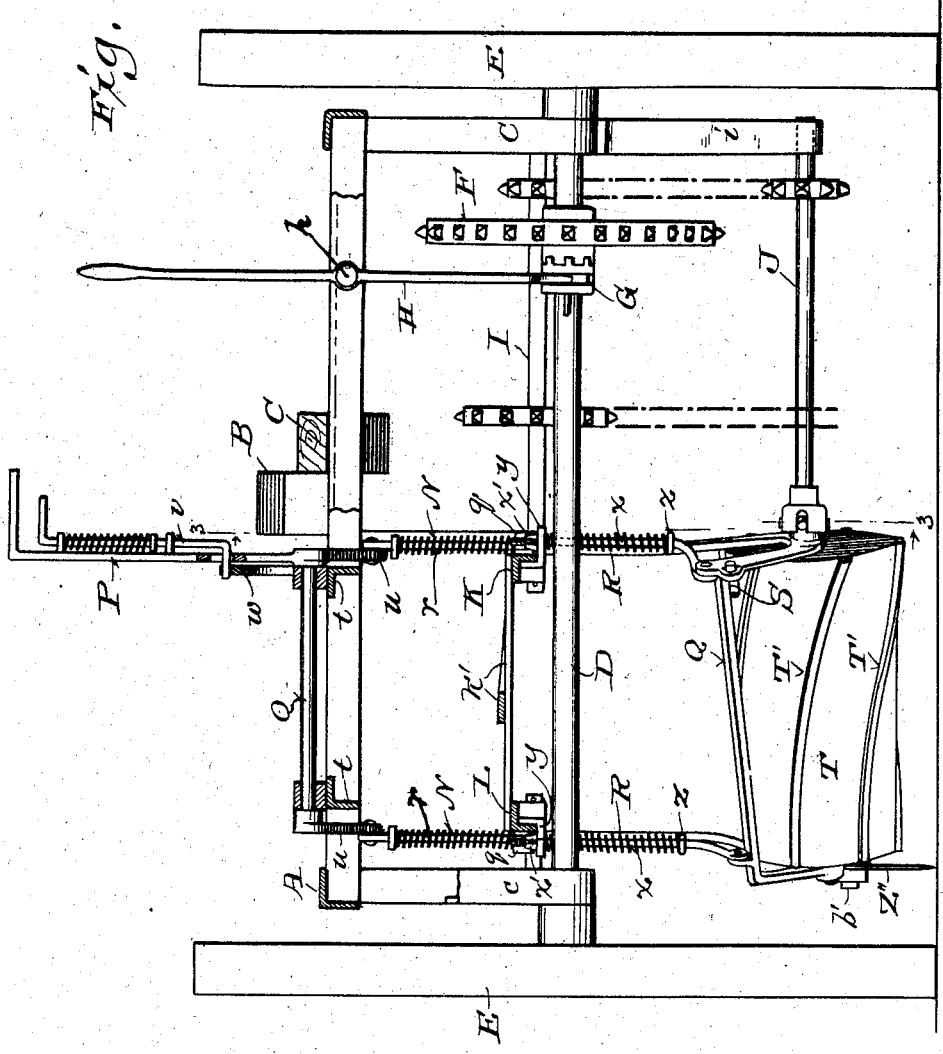

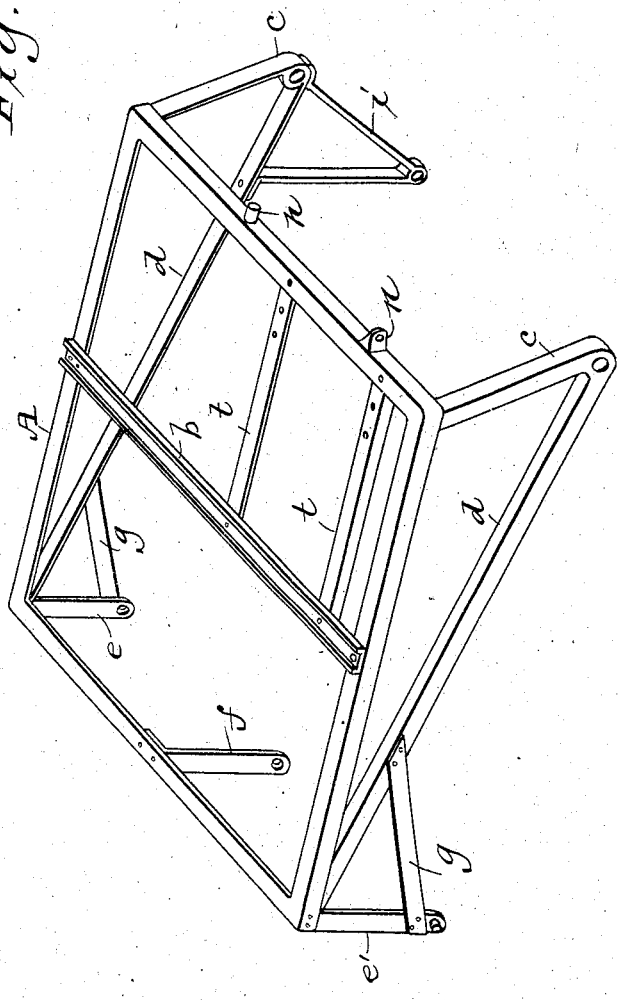

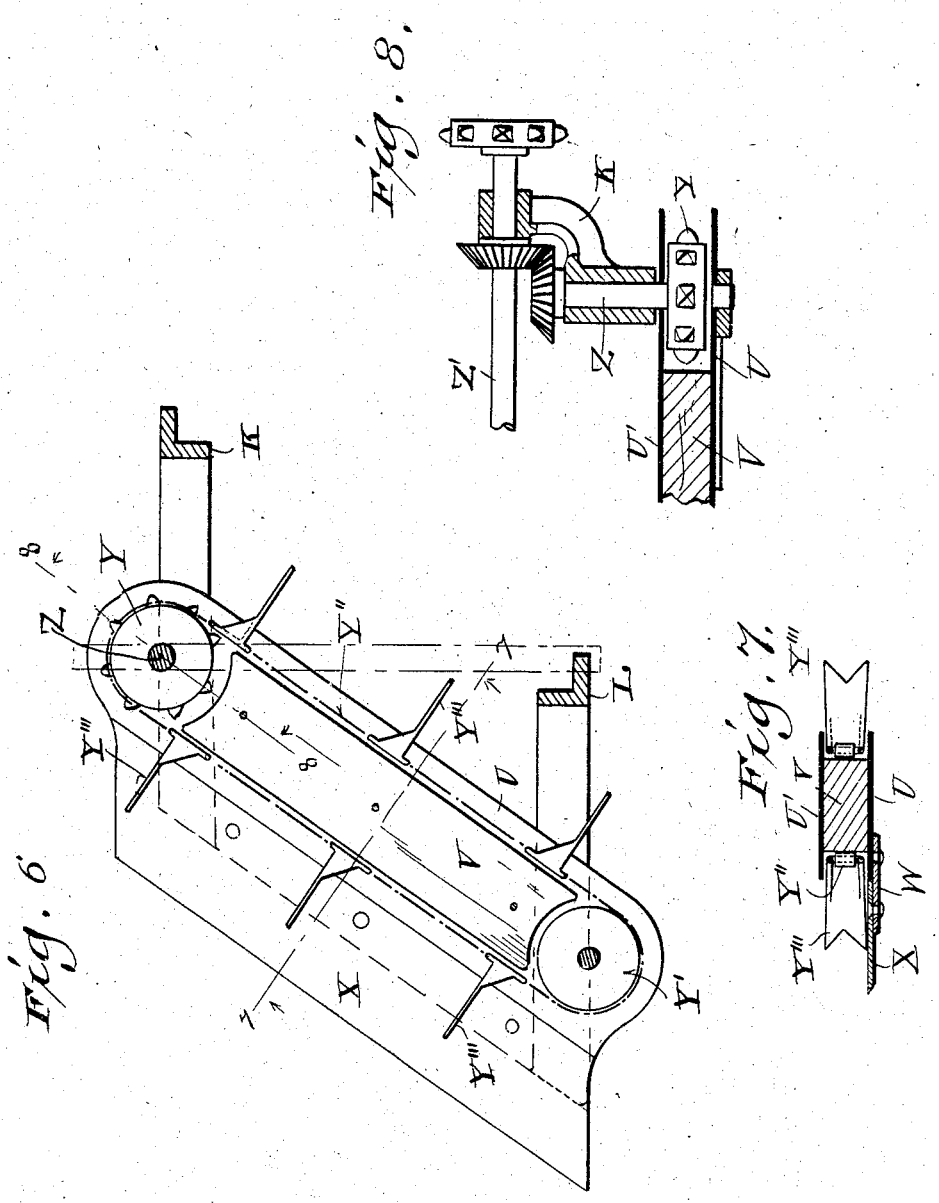

No. 791,687.

Patented June 6, 1905.

UNITED STATES PATENT OFFICE.

LUDWIG GETTELMANN, OF SOUTH GERMANTOWN, WISCONSIN.

BEET-TOPPER.

SPECIFICATION forming part of Letters Patent No. 791,687, dated June 6, 1905.

Application filed November 7, 1904. Serial No. 231,648.

*To all whom it may concern:*

Be it known that I, LUDWIG GETTELMANN, a citizen of the United States, and a resident of South Germantown, in the county of Washington and State of Wisconsin, have invented certain new and useful Improvements in Beet-Toppers; and I do hereby declare that the following is a full, clear, and exact description thereof.

The invention consists in certain peculiarities of construction and combination of parts hereinafter particularly set forth with reference to the accompanying drawings and subsequently claimed, the object of the invention being to provide simple, economical, and efficient machines for topping beets and clearing away the tops preliminary to the removal of said beets from the ground in which they are grown.

Figure 1 of the drawings represents a partly-sectional side elevation of a beet-topping machine in accordance with my invention; Fig. 2, a horizontal sectional view of the machine, this view being indicated by lines 2 2 in Fig. 1; Fig. 3, a vertical longitudinal section view of the machine on line 3 3 in Fig. 4; Fig. 4, a rear elevation of the machine, partly in section; Fig. 5, a perspective view of the draft-frame of the machine; Fig. 6, a detail plan view, partly in horizontal section, illustrating the cutting and conveying mechanism embodied in the machine; and Figs. 7 and 8, detail sectional views respectively indicated by lines 7 7 and 8 8 in Fig. 6.

Referring by letter to the drawings, A indicates a horizontal rectangular frame having a cross-bar $b$ fastened thereon between the ends of same, said bar and frame being preferably made from angle-iron. A draft-tongue B and seat-bar C are fastened to the cross-bar and ends of the frame. Hangers $c$ for an axle D depend from the rear corners of the frame, and struts $d$ are employed to brace these hangers. Other hangers $e$ $e'$ depend from the front corners of the frame and another hanger $f$ is made fast to the front end of said frame. The hangers $e$ $e'$ are connected by braces $g$ with the struts aforesaid.

Traction-wheels E are fast on the axle D, that is loose in its hangers, and a sprocket-wheel F is loose on the axle. Splined on the axle to be engaged with the hub of the aforesaid sprocket-wheel is a clutch G, and a lever H, in pivotal connection with a rear stud $h$, attached to the frame A, has spanner connection with the clutch. A link belt connects the sprocket-wheel F with a similar wheel F', fast on a shaft I, that turns in the bearings $e f$ aforesaid. Depending from one of the hangers $c$ and its companion strut is a bracket $i$, constituting a bearing for a shaft J, that is put in link-belt and sprocket-gear connection with the shaft I above specified. Hung loose on the shaft I and a stud $j$ of the hanger $e'$ are the forward ends of a pair of beams K L, the rear ends of which extend down and forward, their forward extensions being inclined. The upper portions of the beams are connected by braces $k'$ and a cross-bar $k$, through which a bolt $m$ extends. A spiral spring M is connected at its ends to the bolt $m$ and a bracket $n$ attached to the draft-frame A, and the tension of the spring is regulated by means of a thumb-nut $p$ on said bolt in opposition to the cross-bar $k$ aforesaid. Loose in a bracket $q$ of each of the beams K L is a headed rod $r$, in which a pin $s$ is inserted under the bracket, and a spiral spring N surrounds the rod between its head and said bracket. Bars $t$ are connected to the cross-bar $b$ and rear end of the draft-frame, and supported in bearings on the bars is a rock-shaft O, having cranks $u$ in pivotal connection with the heads of the rods $r$, this rock-shaft being controlled by a lever P, provided with a spring-latch $v$, engageable with a notched quadrant $w$ on the draft-frame. By means of the lever the connected beams K L and parts in connection therewith, counterbalanced by the springs M, are raised and lowered. The springs N serve as a yielding resistance to automatic lift of the beams K L and parts in connection therewith.

In pivotal connection with the beams K L is a swing-frame Q, and rods $x$, in similar connection with said frame, are guided in ears $y$ of said beams. Arranged on the rods $x$ between collars $z$ of same and the guide-ears $y$ are spiral springs R, by which yielding resistance is had to automatic lift of the swing-frame, the tension of said springs being regulated by means of thumb-nuts $x'$, run on the screw-threaded upper ends of said rods against said guide-ears. The inner side piece of the swing-frame is connected to the depending portion of the beam L by a tie-rod S, and journaled in said swing-frame is a tapered roller T, having spiral ribs T' longitudinally thereof at regular intervals of its circumference, one of the roller-journals being in universal-joint connection with the shaft J above specified.

Mounted on the inclined lower forward extensions of the rear ends of the beams K L is plate U, supporting a spacing-block V, that in turn supports another plate U', both plates being extended forward and back of the interposed block. Between the beams another plate W is made fast to the one, U, under the same, and a knife X is made fast on the forwardly-extending portion of the under plate. Arranged between the plates U U' adjacent to the ends of the spacing-block V are a sprocket-wheel Y and a roller Y', fast on spindles for which suitable bearings are provided, and engaging said sprocket-wheel and roller is a link belt Y'', having blades Y''' in connection therewith to form a conveyer, said belt being shielded by the plates aforesaid. The spindle Z of the sprocket-wheel Y is bevel-geared to a shaft Z', for which the beams K L are provided with bearings, and by means of link belt and sprocket-wheel gear motion is communicated to said shaft from the shaft I aforesaid.

Loose on a stud $b'$ of a side piece of the swing-frame above specified is a colter Z'', by which sprawling branches of the beet-tops are cut off ahead of the tapered and spirally-ribbed roller above specified.

In practice the beams K L and swing-frame, with parts in connection therewith, are swung down into working position, and as the machine moves ahead the colter Z'' performs its function aforesaid. The axle having been put into clutch with the sprocket-wheel F, rotary motion is communicated to the tapered and spirally-ribbed roller T, as well as to the conveyer back of said roller.

The roller operates to gather the uncut branches of the beets together clear of the knife X, by which said beets are topped, the cuttings being caught by the conveyer and moved off to one side of the machine.

Having thus described my invention, what I claim as new, and desire to secure by Letters Patent, is—

1. A beet-topping machine comprising a draft-frame, axle and traction-wheels; connected counterbalanced beams in pivotally-adjustable independently-yielding connection with the frame, a knife and conveyer in connection with the beams, a swing-frame in independently-yielding connection with the beams, a tapered and spirally-ribbed roller hung in the swing-frame ahead of the knife partly over the same, and means for imparting rotary motion from said axle to said roller and conveyer.

2. A beet-topping machine comprising a draft-frame, axle and traction-wheels; connected counterbalanced beams in pivotally-adjustable independently-yielding connection with the frame, a knife and conveyer in connection with the beams, a swing-frame in independently-yielding connection with the beams, a colter and a tapered and spirally-ribbed roller supported by the swing-frame one ahead of the other forward of the knife, the roller being partly over said knife; and means for imparting rotary motion from said axle to said roller and conveyer.

3. A beet-topping machine comprising a draft-frame, axle and traction-wheels; connected counterbalanced beams in pivotally-adjustable independently-yielding connection with the frame and having lower forwardly-extended inclined ends, a knife and conveyer supported on said ends of the beams, a swing-frame in independently-yielding connection with the beams, a tapered and spirally-ribbed roller hung in the swing-frame ahead of the knife partly over the same, and means for imparting rotary motion from said axle to said roller and conveyer.

4. A beet-topping machine comprising a draft-frame, axle and traction-wheels; connected counterbalanced beams in pivotally-adjustable independently-yielding connection with the frame, a knife and conveyer in connection with the beams, a swing-frame in independently-yielding connection with the beams, a tapered and spirally-ribbed roller hung in the spring-frame ahead of the knife partly over the same, a shaft in suspension from said draft-frame and in universal-joint connection with the roller, and means for imparting rotary motion from said axle to said shaft and the conveyer.

5. A beet-topping machine comprising a draft-frame, axle and traction-wheels; connected counterbalanced beams in pivotally-adjustable independently-yielding connection with the frame, a knife and conveyer in connection with the beams, a swing-frame in independently-yielding connection with the beams, a tapered and spirally-ribbed roller hung in the swing-frame ahead of the knife partly over the same, and clutch-controlled means for imparting rotary motion from said axle to said roller and conveyer.

In testimony that I claim the foregoing I have hereunto set my hand, at Milwaukee, in the county of Milwaukee and State of Wisconsin, in the presence of two witnesses.

LUDWIG GETTELMANN.

Witnesses:
N. E. OLIPHANT,
GEORGE FELBER.